Sept. 5, 1967 R. W. HATCH, JR 3,339,570
FLUID LOGIC TIME TEMPERATURE PROGRAMMER
Filed June 24, 1964
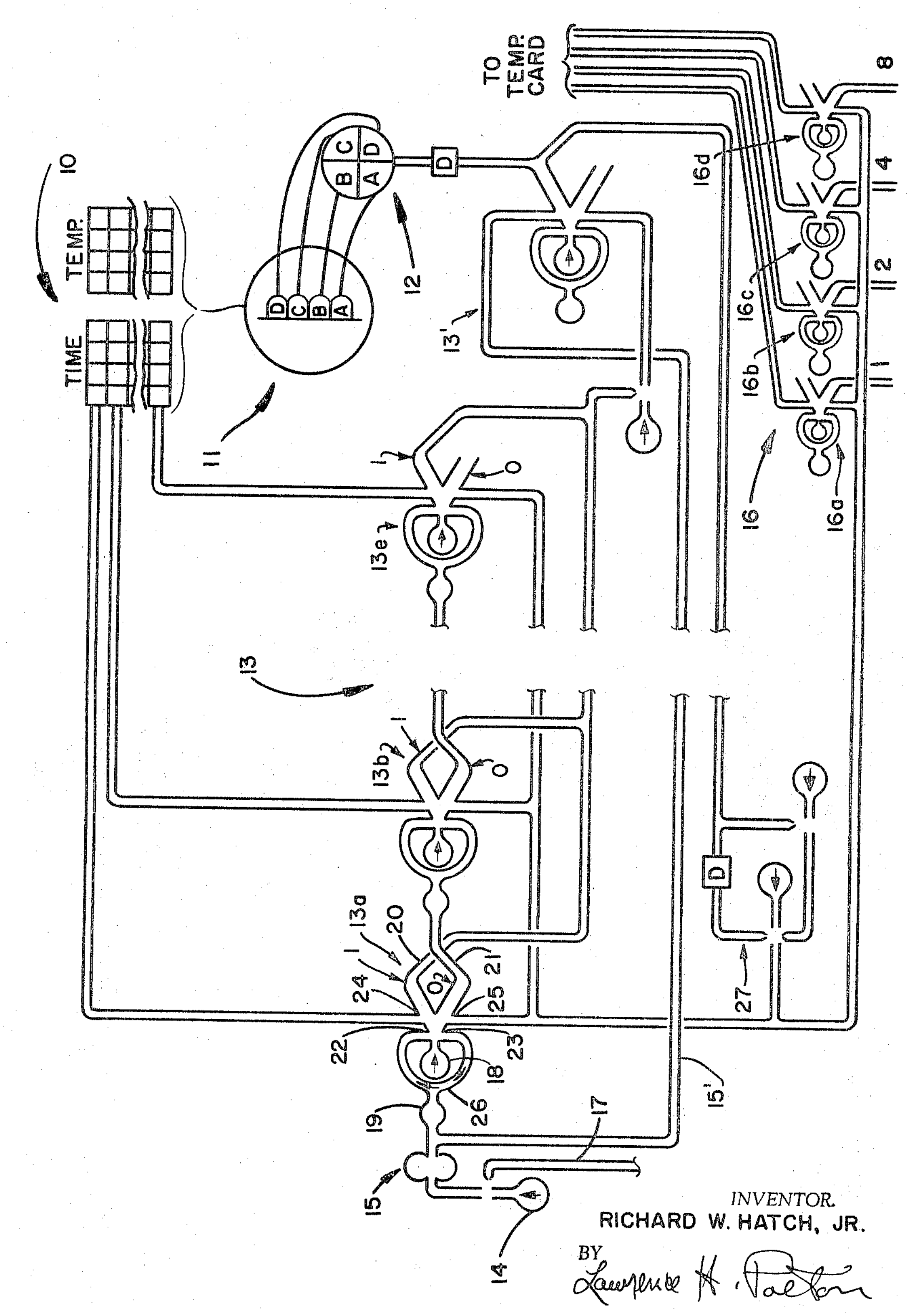
INVENTOR.
RICHARD W. HATCH, JR.
BY Lawrence H. Patton
AGENT United States Patent Office 3,339,570
Patented Sept. 5, 1967

3,339,570
FLUID LOGIC TIME TEMPERATURE PROGRAMMER

Richard W. Hatch, Jr., Norwell, Mass., assignor to The Foxboro Company, Foxboro, Mass., a corporation of Massachusetts Filed June 24, 1964, Ser. No. 377,612
1 Claim. (Cl. 137—81.5)

This invention relates to fluid logic systems on a dynamic, continuous flow basis, and has particular reference to a system for programming a timed pattern of temperature changes. The time and temperature information is derived from pre-determined perforations on program cards.

Function and general working: The circuit is used in applications where the set point (temperature or other variable) is to be X° for the first five minutes, Y° for the next three minutes, and so on. This is called a time-temperature program. This program is stored on punched cards, usually one time card and one temperature card. For instance, one row of holes on the temperature card will correspond to the temperature set point in binary notation. Similarly the corresponding row of holes on the time card represents, in binary notation, the amount of time that the set point temperature should be at that level. After that period of time has elapsed the next row of time and temperature cards is read and held.

An oscillator 15 puts out a fixed frequency. The sequencing and time programming is done by the binary counter 13 which counts this frequency. This may be a ten stage counter, which counts up to 1023, all ones, then goes to its zero position, all zeros.

The time programming is accomplished by setting the binary complement of the card time into the counter, and there letting it count up to its all-zero position.

If the number on the card is 314 or, in binary notation, 0–1–0–1–1–1–0–0–1–0, then its complement is 1–0–1–0–0–0–1–1–0–1, or 709. If the counter is set at 709, it will take 1023 minus 709 or 314 counts to get to the all-ones position. When the counter is at all-ones the count is known to be 314—the punch card internal count.

The start of the operation is by air jets passing through the row of holes in the time card. The complement of the punch card time is set into the binary counter. Jets passing through the row of holes in the temperature card set the flip-flops of the temperature register to the same binary number. This temperature number may if desired, go through a binary-to-analog converter, and end up as a 3–15 lb. pressure set point.

When the counter shows all zeros, a flip-flop 13' is activated to reset the counter 13 and a temperature memory register 16. After a delay, this flip-flop also triggers a ring counter 12, which is merely a means to index the next row of time and temperature card signals to be acted upon, and to set in the time factor and the temperature memory. The next pulse from the oscillator 15 resets the output flip-flop 13'.

It is therefore an object of this invention to provide a new and useful time temperature programmer in terms of a fluid logic dynamic, continuous flow system.

Other objects and advantages of this invention will be in part apparent and in part pointed out hereinafter and in the accompanying drawing, wherein:

The drawing is a schematic representation of an illustrative form of a fluid logic time temperature programmer system according to this invention.

The device of this invention is for use with an operating system comprising an ordinary fluid ring counter 12, which is indexed by signals from the output flip-flop 13', and which in turn sets the ordinary punch card and manifold combinations 10 and 11 to the next step of planned time-temperature combination.

The combination for use with this operating system is the time function binary counter 13 made up of flip-flop units 13*a*, 13*b*, and 13*c*, usually ten units; the temperature function memory bank of flip-flop units 16*a*, 16*b*, 16*c*, 16*d*, etc. as needed; the output flip-flop unit 13', a reset pulse generator 27, and an oscillator 15.

The time and temperature punch card set is indicated a 10, with horizontal series of punched openings selected from the manifold 11 according to the operation of the ring counter 12. The time punch card provides a series of individual selective directives to each of the units in the counter assembly 13, to set up a complement of a desired number. This number is counted off on the basis of input pulses derived from a steady flow source 14 which is translated into pulses in the oscillator 15. Thus, on actuation, the counter 13 racks up its full count in a time called for by the particular punch card selection. At the same time a temperature memory 16 is actuated by individual flip-flops such as 16*a* in accordance with the binary temperature punch card openings for a time determined by the punch card time directives to the counter unit 13.

The readout of the temperature memory 16 is digital as 1 or 0, with 16*a* as 1, 16*b* as 2, 16*c* as 4, and so on in binary fashion, and may be converted to an analog signal by any suitable means and can give as many as 16 different temperatures as pre-selected. A signal "off" control as at 17 may be operated by interrupting the power flow from source 14 with a fluid transverse jet when the temperature is at the program level by any suitable temperature measuring means associated with the temperature memory to shut off the input to allow the counter 13 to operate only while the temperature is at the programmed level and not while it is climbing to or descending from a new or previous level.

In the manifold 11 cards put in, and selecting manifolds are placed so that on the input side manifolds are common to individual program stages, and the other side of the card is manifold arranged so they are common to the counter bit levels. The counter will ordinarily have 10 bits.

Basic to the timing circuit is the binary counter unit 13 made up of flip-flop devices. The operation of these flip-flop devices is illustrated herein with respect to the first of the series.

It is shown by arrows in the loop 26 that this first flip-flop is in the "one" condition, that is, the power flow is in the output 20. The unit is provided with a power source 18 and the signal input from the oscillator 15 is indicated at 19. The flip-flop outputs are indicated at 20 and 21 with input signal controls at 22 and 23. A setting control jet is indicated at 24 and a reset, oppositely disposed jet at 25. Assuming this flip-flop to be in the "one" condition the power flow is held against the "one" (output 20) side wall by aerodynamic forces which manifest themselves in a low pressure along the "one" side wall. Consequently there is a circulation of air in the triggering loop 26 as shown by the arrows, due to the pressure difference thus created.

If the signal source of pulses is turned on, this situation will steer the first oscillator signal to the "one" side to flip the power flow from 18 to the 0 side (21) where it will remain attached according to the bi-stable nature of the device until the next oscillator signal.

This first signal thus triggers the first flip-flop to the zero condition. Removal of the signal or further increase has no effect. Accordingly this is a binary counter stage which responds to upward steps in the upgoing side of finite pulses.

Initially the counter may be set to the all-one condition by a short pulse supplied to the reset manifold from the reset generator 27. Certain counter units corresponding to the time holes punched in the time card, are then changed to zero condition by air through the time card holes to the individual counter units in a manner to establish, in the counter, the complement of the time figure punched in the card, for instance:

| | 1 | 2 | 4 | 8 | 16 | 32 | 64 | 128 | 256 | 512 |
|---|---|---|---|---|---|---|---|---|---|---|
| All "1's" | 1 | 1 | 1 | 1 | 1 | 1 | 1 | 1 | 1 | 1 |
| Punched time | 0 | 1 | 0 | 1 | 1 | 1 | 0 | 0 | 1 | 0 |
| Complement in counter | 1 | 0 | 1 | 0 | 0 | 0 | 1 | 1 | 0 | 1 |

In this case the punched time is 2+8+16+32+256=314 counts.

In order to fill up the counted to the all-one condition again it will be necessary in this case to have 314 counts on the oscillator or a one pulse per time unit counter, 314 time units. Considering the first pulse as the initial point, this is elapsed time of 313 time units. One more count or 314 time units, the punched-in time, will transfer the counter from the all-one's to the all-zero's condition and then turn on the output inverter, flipping the output flip-flop 13' to the "one" condition.

This output triggers the reset pulse generator 27, resetting the counter 13 and resetting the temperature memory 16. After a short delay the output also triggers the ring counter 12, transferring to the next manifold position on the time-temperature cards, setting up a new time interval in the counter 13 and a new temperature value in the temperature memory 16.

Finally the first pulse in the next interval resets the output flip-flop 13' by a signal through connection 15' to the output flip-flop 13'.

As previously discussed the control 17 is an optional feature shown as a switch device for keeping the oscillator turned off until the temperature has reached a set point determined by the temperature memory.

This invention therefore provides a new and useful fluid logic time temperature programmer based on a dynamic, continuous flow system.

As many embodiments may be made of the above invention, and as changes may be made in the embodiments set forth above without departing from the scope of the invention, it is to be understood that all matter hereinbefore set forth or shown in the accompanying drawing is to be interpreted as illustrative only and not in a limiting sense.

I claim:

A dynamic, continuous flow fluid logic time-temperature programmer system for use with operating means comprising a fluid ring counter operable from a fluid input signal, and fluid manifold and time-temperature punch cards operable with respect to said ring counter to provide working output signals from said operating means, said system comprising, in combination, a fluid logic time function binary counter system subject to time function setting signals from said operating means, a fluid logic temperature function binary memory system subject to temperature function setting signals from said operating means, an output fluid logic flip-flop system operable to produce a working output signal in response to a predetermined final condition of said counter system, a connection from said working output to said operating means, and a delay in said working output connection, a reset pulse generator system for simultaneously resetting all of the units of said time function binary counter system, and at the same time simultaneously resetting all of the units of said temperature function binary memory system, an oscillator system for applying fluid pulses at a fixed frequency to the input of said time function binary counter, and switch means for shutting off the output of said oscillator to control application of said fixed frequency to said counter, said time function counter system comprising a series of fluid logic oscillator flip-flop units, each of said units having a power flow input, an output to the next step in the counting action of said series, an output to said output flip-flop system, a transverse set control input from said time function operating means, a transverse reset control input from said reset pulse generator system, and a signal input yoke connected from said input oscillator system, with two control inputs oppositely and transversely opposed to each other across the flip-flop unit, said temperature function binary memory system comprising a series of fluid logic temperature flip-flop units, a power flow input to each of said units, a control set input to each of said temperature units from said temperature function operating means, a control reset input to each of said temperature units from said reset pulse generator system, and a readout output from each of said units, said output flip-flop system comprising a single fluid logic flip-flop unit, said single unit having a power flow input, a vent output, a working output through said operating connection to said operating means, a connection from said working output to said reset pulse generator system, a control input to said single flip-flop unit from the output of said oscillator system, and a second control input to said single unit, said second control input comprising a power flow, a fluid switch for controlling said power flow, and fluid control means for said fluid switch connected to manifold from the output therefor in each of the units of said time function counter system, and said reset pulse generator system comprising a main power flow input connected in manifold to the reset input control of each of the flip-flop units of said time function counter system, and in manifold to the reset input control of each of the flip-flop units of said temperature function memory system, a fluid switch in said reset power input, a first fluid control input to said last named fluid switch from said working output connection of said single unit output flip-flop system, a delay in said last named control input, a second control input to said last named fluid switch, a power flow input to said last named control input, a fluid switch in said last named power flow input, and a control input to said last named switch from said last named first fluid control input at a point prior to said last named delay.

References Cited

UNITED STATES PATENTS

| | | | |
|---|---|---|---|
| 3,001,693 | 9/1961 | Warren | 137—81.5 X |
| 3,155,825 | 11/1964 | Bootheq | 137—81.5 X |
| 3,180,575 | 4/1965 | Warren | 137—81.5 X |
| 3,191,611 | 6/1965 | Bauer | 137—81.5 |
| 3,199,782 | 8/1965 | Shinn | 137—81.5 X |
| 3,229,705 | 1/1966 | Norwood | 137—31.5 |
| 3,250,285 | 2/1966 | Vockroth | 136—81.5 |

M. CARY NELSON, *Primary Examiner.*

S. SCOTT, *Assistant Examiner.*